E. SCHNEIDER.
REMOVABLE TIRE FOR THE WHEELS OF GUN CARRIAGES AND OTHER VEHICLES.
APPLICATION FILED MAR. 31, 1919.

1,343,936.

Patented June 22, 1920.

E. SCHNEIDER.
REMOVABLE TIRE FOR THE WHEELS OF GUN CARRIAGES AND OTHER VEHICLES.
APPLICATION FILED MAR. 31, 1919.

1,343,936. Patented June 22, 1920.
3 SHEETS—SHEET 2.

E. SCHNEIDER.
REMOVABLE TIRE FOR THE WHEELS OF GUN CARRIAGES AND OTHER VEHICLES.
APPLICATION FILED MAR. 31, 1919.

1,343,936.

Patented June 22, 1920.
3 SHEETS—SHEET 3.

UNITED STATES PATENT OFFICE.

EUGÈNE SCHNEIDER, OF PARIS, FRANCE, ASSIGNOR TO SCHNEIDER & CIE., OF PARIS, FRANCE, A LIMITED JOINT-STOCK COMPANY OF FRANCE.

REMOVABLE TIRE FOR THE WHEELS OF GUN-CARRIAGES AND OTHER VEHICLES.

1,343,936.     Specification of Letters Patent.     Patented June 22, 1920.

Application filed March 31, 1919. Serial No. 286,498.

*To all whom it may concern:*

Be it known that I, EUGÈNE SCHNEIDER, citizen of the French Republic, and resident of 42 Rue d'Anjou, Paris, France, have invented a new and useful Improved Removable Tire for the Wheels of Gun-Carriages and other Vehicles, which invention is fully set forth in the following specification.

This invention has for its object to provide an improved removable tire or auxiliary tread for the wheels of gun carriages and other vehicles, designed to increase the bearing area of the wheels on soft ground.

The improved tire or tread consists in a known manner of a series of elements or sections surrounding the rim of the wheel and arranged end to end against one another, these elements being fixed around the tire by means of clips placed between the spokes of the wheel.

The essential characteristic feature of the improved tire or tread consists in this that its elements or sections are constituted each by a series of ratans, arranged side by side and curved to the form of sectors concentric to the wheels, these ratans being fixed at their ends in molded or forged members on which the attaching clips are pivotally mounted.

In a practical constructional form of this invention, the ratans fixed in the molded or forged members, are also connected together by a transverse plaiting of osiers, wire, or other suitable flexible material. The elements of the improved tire may be protected by a casing of sheet steel or other metal which may be attached to the plaiting for connecting the ratans together by sewing with wire.

Two constructional examples of the invention are illustrated in the accompanying drawings in which:—

Figure 1:
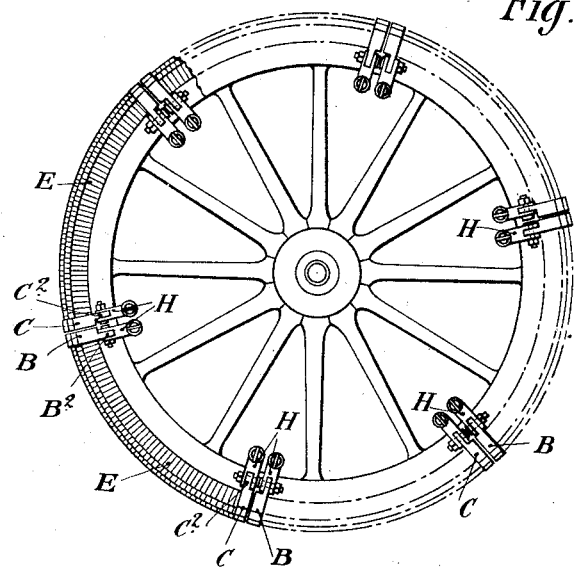
Figure 1 is a side elevation partly in section of a vehicle wheel provided with a tire according to this invention.
Figure 3:
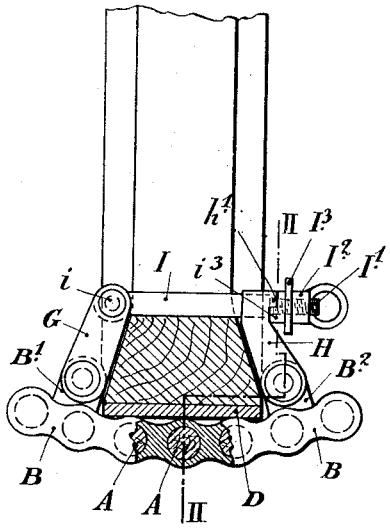
Figure 5:
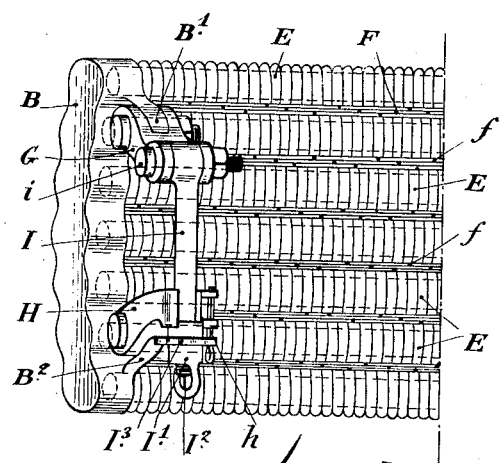
Fig. 5 is a half plan corresponding to the side elevation shown in Fig. 2.
Figure 2:
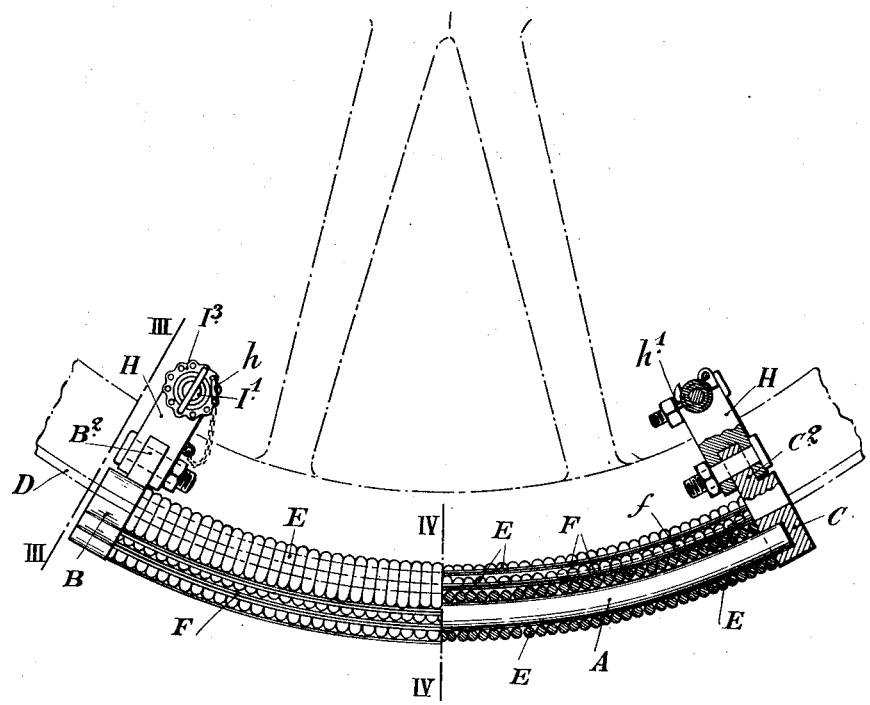
Fig. 2 is a view of an element of the improved tire, drawn to a larger scale, half in side elevation and half in section on the line II—II of Fig. 3, which latter figure is a cross section on the line III—III of Fig. 2.
Figure 4:
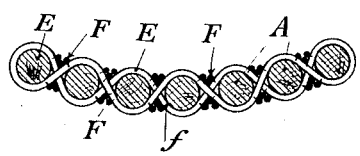
Fig. 4 is a section on the line IV—IV of Fig. 2.

Each element or section of the improved tire consists of a series of ratans A suitably curved and fixed at their ends in molded or forged members B and C.

These members, which are suitably curved in the transverse direction, form a kind of box or casing having mortises equal in number to the ratans A. This number is such that when the tire element is in position on the wheel, it will project appreciably beyond both sides of the wheel rim D.

In practice the continuity of the tire, and also its suppleness are assured by connecting the ratans together by means of a plait E preferably of osiers. The transverse plait may be completed by longitudinal thin rods F of osier or other devices which may be fixed to the transverse plaiting E by means of nails $f$.

The clips for fastening together the tire elements may, as shown in the drawings, be constituted as follows:—

The ends of the molded or forged members B and C are formed with lugs $B^1$, $B^2$, and $C^2$, respectively. To these lugs are pivoted links G and H. One of the links namely the link G, carries the pivot pin $i$ of a connector such as I, by means of which the clip is closed by connecting the two links together. The connector I may be a pivoted bolt of the usual construction. In the example shown the free end of the link H constitutes a bearing for the reception of the free end of the connector I. This connector has a screwthreaded end $I^1$ on which there is screwed a nut $I^2$ carrying a perforated disk $I^3$ so that the nut can be locked by means of a pin $h$ engaged in lugs on the links H. The nut $I^3$ may have a shoulder $i^3$ which engages under a nose $h^1$ on the link H when the locking has been effected.

Figure 7:
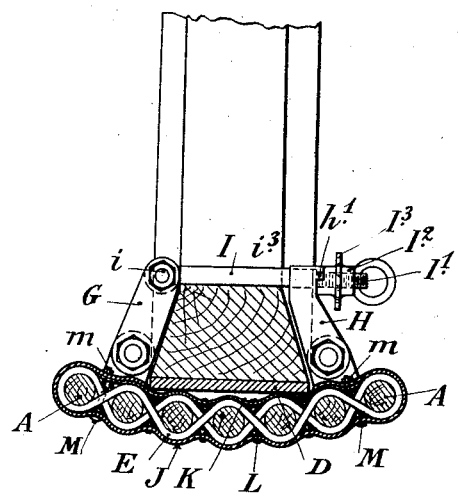
Figs. 6 to 8 illustrate a second constructional form, respectively in part plan and in sections on the lines VII—VII and VIII—VIII of Fig. 6.
Figure 6:
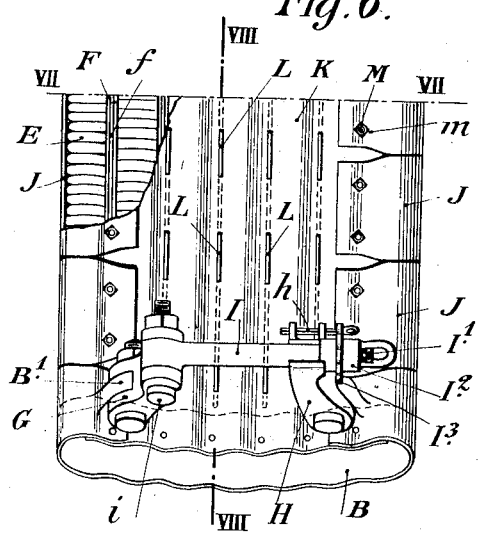
Figure 8:
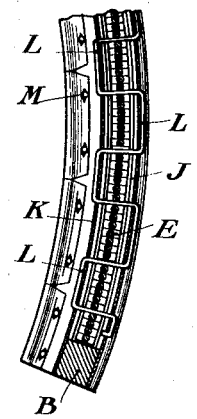

As shown in the modification shown in Figs. 6, 7 and 8 each tire element may be protected by a sheet metal sheathing or casing. This casing may be made in two parts, namely the tread member J inclosing the outer surface of the tire and its edges, and the backing member K, of less thickness, inclosing the greater portion of the inner surface of the tire. The parts J and K may be connected together and fastened to the tire element proper by sewing by means of wires L. The assemblage may be completed by small bolts M which are engaged in the edges of the sheet metal part J and pass between the ratans A, and are secured by nuts m.

What I claim is:—

1. An auxiliary wheel-tread comprising a plurality of longitudinally disposed ratans plaited with transverse osiers, and means for securing the tread on the periphery of the wheel.

2. An auxiliary wheel-tread comprising a plurality of longitudinally disposed flexible rods and transverse flexible members interwoven with said rods, a protective sheathing for the tread, and means for attaching the tread to the periphery of the wheel.

3. An auxiliary wheel-tread consisting of a series of removable sections adapted to be arranged around the periphery of a wheel, said sections having a width greater than that of the permanent tread of the attached wheel to increase the ground-bearing surface of such wheel, each section comprising a flexible body and stiffening casings at its ends projecting beyond the sides of the attached wheel to support the edges of the flexible body projecting beyond the sides of the wheel, and means for detachably securing the section to the periphery of the wheel.

4. An auxiliary wheel-tread comprising a plurality of longitudinally disposed ratans plaited with transverse flexible members, and means for securing the tread to the periphery of the wheel.

5. An auxiliary wheel-tread consisting of a series of removable sections adapted to be arranged around the periphery of a wheel, said sections having a width greater than that of the permanent tread of the attached wheel to increase the ground-bearing surface of such wheel, each section comprising a plurality of longitudinally disposed ratans plaited with transverse flexible members, a stiff casing at each end of the section engaging the ends of the ratans to hold the latter in place, said casing projecting at its ends beyond the sides of the attached wheel to support the projecting edges of the section, and means for detachably securing the sections to the periphery of the wheel.

In testimony whereof I have signed this specification.

EUGÈNE SCHNEIDER.